United States Patent

[11] 3,589,676

| [72] | Inventors | Linwood P. Erickson<br>Barrington;<br>Williams G. Getchell, Bristol, both of, R.I. |
|---|---|---|
| [21] | Appl. No. | 827,706 |
| [22] | Filed | May 26, 1969 |
| [45] | Patented | June 29, 1971 |
| [73] | Assignee | G. W. Dahl Company, Inc.<br>Bristol, R.I. |

[54] VALVE SEAL
4 Claims, 3 Drawing Figs.

[52] U.S. Cl. .................................................. 251/172, 251/333
[51] Int. Cl. .................................................. F16k 1/42
[50] Field of Search ......................................... 251/172, 171, 170, 333

[56] References Cited
UNITED STATES PATENTS

| 2,713,989 | 7/1955 | Bryant | 251/333 X |
| 2,970,802 | 2/1961 | Ocampo | 251/172 |
| 3,160,387 | 12/1964 | Windsor | 251/172 |

Primary Examiner—Harold W. Weakley
Attorney—Salter & Michaelson

ABSTRACT: A seal of particular utility in connection with reducing valves operating under extremely high pressures, said seal comprising an annular deformable member that cooperates with a valve plug to block passage through a bore, said seal having an annular recess on its upstream surface, which recess has therein a deformable ring, means for permitting communication between said bore and said recess; whereby when said plug is in closed position, pressure in the system will be diverted via said means to said recess to deform said ring, said deformation forcing the seal radially inward to further increase pressure between the seal and the plug, and venting means extending through said seal in communication with said recess and communicating with said bore downstream of said seal.

PATENTED JUN 29 1971 3,589,676

INVENTORS
LINWOOD P. ERICKSON
WILLIAMS G. GETCHELL

BY *Salter + Michaelson*

ATTORNEYS

VALVE SEAL

BACKGROUND OF THE INVENTION

A serious problem has existed in connection with pressure-reducing valves operating under extremely high pressures. More specifically, in valve systems where the input pressure is in the neighborhood of 5,000 pounds per square inch and it is desired to reduce the pressure to the neighborhood of 130 pounds per square inch, it has been found that the valve seals are not able to stand up to the high flow rate, which may be in excess of 10,000 standard cubic feet per minute, where air is employed, with the result that the seals are frequently blown out.

SUMMARY OF THE INVENTION

The instant invention is directed to a novel and improved seal for high-pressure reducing valves that functions to provide a highly effective seal and yet is able to withstand the high pressures and flow rate normally encountered.

The seal of the instant invention embodies a deformable annular member, the inner surface of which cooperates with a valve plug to effectively block flow through a bore. The seal has an annular recess provided on its upstream surface, which recess receives therein a deformable ring member. A passage exists at the upstream end of the seal that permits communication between the bore and the recess, whereby when the plug is moved to closed position, the flow is diverted through the passage to the recess to deform the ring member. Deformation of the ring member forces the seal radially inward to increase the pressure between the seal and the plug. To insure proper deformation of the ring member, a port extends through the seal in communication with the recess and in communication with the bore downstream of the seal.

It has been found that a seal embodying the above general structure is highly effective when used with a high-pressure reducing valve and is not subject to frequent blowouts.

It has further been found that a seal constructed in accordance with the instant invention is effectively usable for any usual fluid media and is economically feasible to manufacture and sell.

DESCRIPTION OF THE FIGURES

In the drawings which illustrate the best mode presently contemplated for carrying out the present invention.

DESCRIPTION OF THE INVENTION

Figure 1:
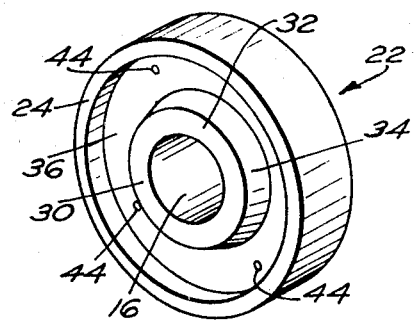
FIG. 1 is a perspective view of the seal member per se.

Referring to the drawings, there is shown a valve assembly comprising a housing 10 consisting of annular members 12 and 14 having a bore 16 extending therethrough. As will be noted, due to the inner configuration of the member 14, the bore widens as at 18; and the members 12 and 14, when assembled define an annular space 20 for receiving the annular seal member shown generally at 22.

The seal 22 is constructed of any suitable deformable material, and it has been found in practice that Teflon (trademark of Du Pont) is particularly adaptable. As will be noted, the seal 22 has an upwardly extending outer portion 24 which cooperates with downwardly extending portion 26 of member 12 to securely position the seal in the space 20. As will be apparent, the members 12 and 14 are configured so as to provide a space that is complementary to the shape of seal 22, whereupon the latter is maintained in securely assembled position between members 12 and 14, as clearly shown in FIGS. 2 and 3. Seal 22 further comprises an inner hublike portion 28 having an inner surface 30, an upper surface 32, and an inclined shoulder 34. The shoulder 34, bottom wall 36, and the inner edge 38 of portion 26 define a recess 40 which receives therein a deformable ring 42, constructed of any suitable deformable material, such as polyurethane. A plurality of circumferentially spaced ports 44 extend through seal 22 in communication with recess 40, the bottom end of said ports being in communication with a second port 46 that extends through member 14 into communication with the widened bore 18. It is important to note that the upper surface 32 of the seal 22 is spaced from the lower surface 48 of member 12 so as to provide a passage 50 that interconnects bore 16 and recess 40. It is further important to note that the inner wall 30 of seal 22 extends inwardly of bores 16 and 18. Expressed differently, the diameter defined by the wall 30 is smaller than the diameter of bores 16, 18. In addition, wall 30 is tapered inwardly from bottom to top, when viewing FIG. 2.

Figure 2:
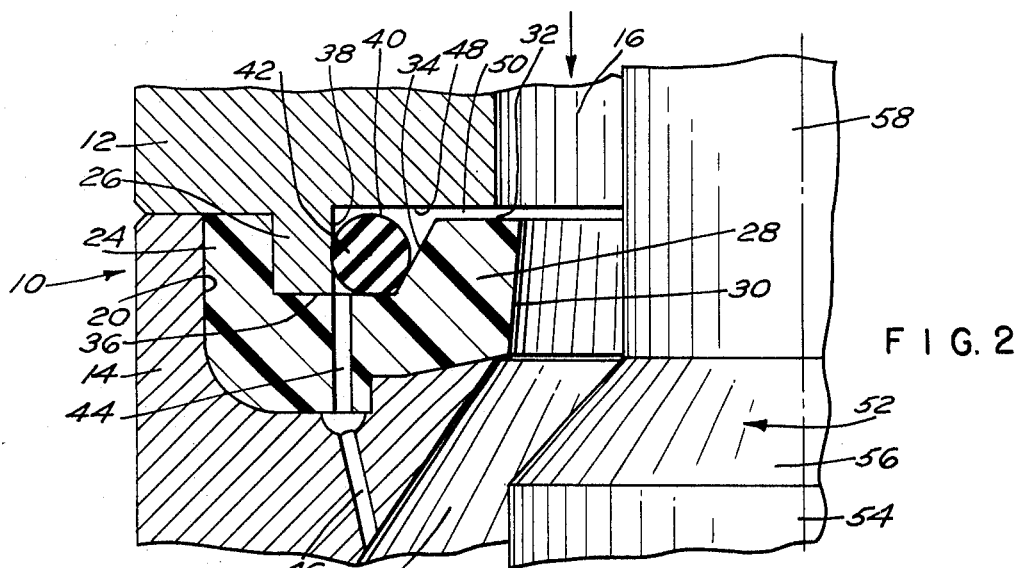
FIG. 2 is a fragmentary sectional view showing the valve assembly in open position.
Figure 3:
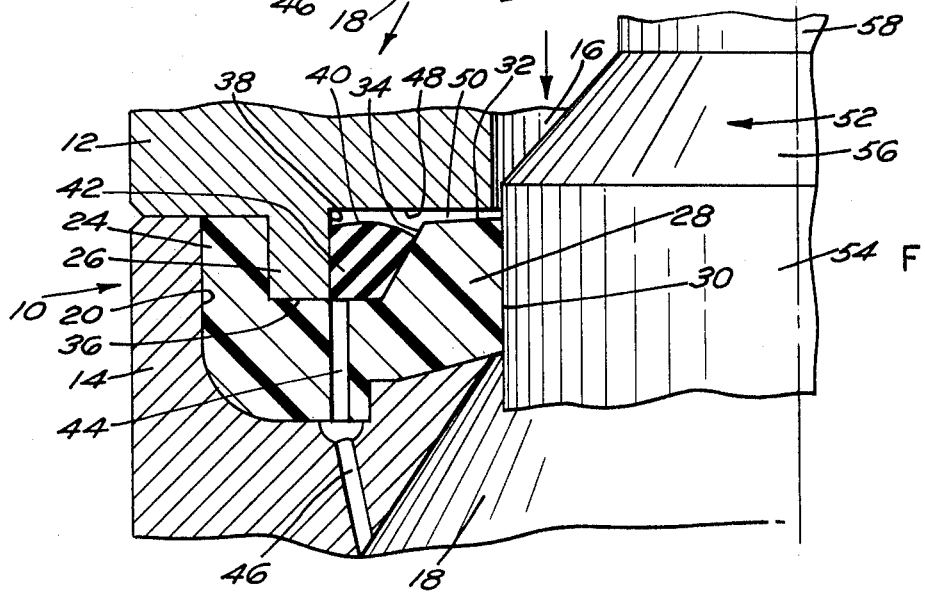
FIG. 3 is a fragmentary sectional view showing the valve assembly in closed position.

The direction of fluid flow through the valve assembly illustrated in FIGS. 2 and 3 is in the direction of the arrows shown, or, expressed differently, from top to bottom. A plug member 52 having an enlarged portion 54, a beveled portion 56, and a reduced stem portion 58 is positioned in bore 16 and is reciprocated by any suitable means between the open position shown in FIG. 2 and the closed position shown in FIG. 3. It will be understood that the diameter of enlarged portion 54 is larger than the largest diameter of annular wall 30 but smaller than the diameter of bore 16. Thus, as enlarged portion 54 is moved from its downstream position of FIG. 2 upwardly to the closed position illustrated in FIG. 3, the seal member 22 will be deformed as illustrated. When portion 54 makes contact with the inner wall 30 of seal 22, the flow of fluid through bore 16 will be diverted through passage 50 to recess 40, whereupon the extreme pressure will cause deformation of ring member 42, as illustrated in FIG. 3. This deformation results in a thrust against inclined shoulder 34 which in turn forces annular wall 30 more tightly against the plug portion 54 to further enhance the effectiveness of the seal therebetween.

The ports 44 and 46 function to insure the aforesaid deformation of ring member 42. More specifically, if these ports were not provided and no venting means were present, it is possible that the pressure in recess 40 might equalize around ring member 42 sufficiently so that the desired deformation of said member would not take place. The presence of ports 44 and 46 result in a suctionlike effect that pulls down ring member 42 and deforms same, as illustrated in FIG. 3. It will be understood that the inclination of inner annular wall 30 facilitates movement of plug portion 54 into engagement therewith, and the fact that the plug portion 54 is smaller in diameter than bore 16 insures that no interference between these metallic parts will take place during reciprocation of plug 52.

It has been found that the seal 22 in combination with ring member 42 results in an extremely effective seal, and one capable of withstanding input pressures in the neighborhood of 5,000 pounds per square inch and rates of flow in the neighborhood of 10,000 standard cubic feet per minute where air is employed. In addition, it has been found that this seal will function efficiently with any usual fluid media.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described.

What we claim is:

1. In a valve assembly comprising a housing having a bore extending therethrough and a reciprocable plug in said bore movable axially between a closed and open position, a deformable annular seal mounted in said housing in concentric relation to said bore and having an inner annular wall, the diameter of which is less than the diameter of said bore, said seal cooperating with said plug when the latter is in its closed position to effectively block said bore, said seal comprising a body portion having a first surface extending radially outward from the upstream end of said wall and a second oppositely disposed surface extending radially outward from the downstream end of said wall, an annular recess in said first surface, a deformable ring member in said recess, and a passage at the upstream end of said seal providing communication between said bore and said recess, whereby when said plug is moved to closed position, pressure in the system is diverted through said passage to said recess to deform said ring member, said deformation forcing said seal radially inward to further increase the closure pressure between said seal wall and said plug, said seal further having an opening in communication with said recess and extending through said body portion to said second surface, and an aperture in said housing communicating with said opening and extending to said bore at a point downstream of said seal.

2. In the valve assembly of claim 1, said passage comprising clearance between said first surface and said housing.

3. In the valve assembly of claim 1, said recess having an inclined inner shoulder, the inclination being toward said bore from the downstream end of said inner shoulder.

4. In the valve assembly of claim 1, said plug being downstream of said seal when in its open position, said inner annular wall tapering inwardly from its downstream end.